United States Patent [19]
Baik

[11] Patent Number: 5,839,792
[45] Date of Patent: Nov. 24, 1998

[54] CHILD SAFETY BELT DEVICE

[76] Inventor: Seong-Gon Baik, 260-14, Sinwon-dong, Deokyang-ku, Koyang-shi, Kyoungki-do, 412-070, Rep. of Korea

[21] Appl. No.: 847,477

[22] Filed: Apr. 25, 1997

[30] Foreign Application Priority Data

May 27, 1996 [KR] Rep. of Korea ............. 1996-13229 U

[51] Int. Cl.⁶ .................................................. B60R 22/00
[52] U.S. Cl. .......................................... 297/483; 297/468
[58] Field of Search ................................ 297/483, 463.1, 297/464, 468, 485, 482

[56] References Cited

U.S. PATENT DOCUMENTS 4,726,625  2/1988  Bougher .
4,946,198  8/1990  Pittore et al. .
5,570,933  11/1996  Rouhana et al. .
5,605,380  2/1997  Gerstenberger et al. .

Primary Examiner—Milton Nelson, Jr.
Attorney, Agent, or Firm—Sixbey, Friedman, Leedom & Ferguson; David S. Safran

[57] ABSTRACT

A child safety belt device used in combination with a safety belt for adjusting the position of a shoulder band of the safety belt to accommodate the proportions of a smaller passenger such as a child. The device includes: a fixing portion for fixing the device to the safety belt, the fixing portion being detachably fixed to a waist band of the safety belt; a link portion being attached to a shoulder band of the safety belt; a band for connecting the fixing portion with the link portion, the band being adjustable in length; and a stopper mounted on the band for keeping the length of said band in place.

2 Claims, 4 Drawing Sheets

CHILD SAFETY BELT DEVICE

BACKGROUND OF THE INVENTION

1. Field of Invention

The present invention relates to a child safety belt device, and more particularly to a child safety belt device used in combination with a conventional safety belt, for securing a smaller passenger, such as a child, with the safety belt by controlling the position of a shoulder band of the safety belt to accommodate the physical proportions of the child.

2. Description of the Related Art

In general, a conventional safety belt in an automobile is manufactured in accordance with the physical proportions of an adult. The safety belt includes a waist band and shoulder band which overlaps and secures the waist and shoulder of a passenger or driver. In the event of a collision or other type of accident, a person secured by the safety belt is prevented from falling out of the automobile or from violently impacting the windshield or other parts of the vehicle. Consequently, the safety belt is a preventative measure to protect against injury due to accidents.

As stated earlier, since the conventional safety belt constructed as above is manufactured to match the physical proportions of an adult, a smaller passenger, such as a child having smaller physical proportions is not adequately secured. In particular, the shoulder band of the conventional safety belt cannot be properly positioned to adjust to a child's physical proportions. Accordingly, the safety belt does not adequately secure the shoulder of the child, and the shoulder band often overlaps the child's head or neck causing discomfort and serious potential injury. As a result, a child is often not secured by the safety belt when riding in a vehicle. Thus, the child faces a greater risk of severe injury in the event of an accident due to the lack of adequate positioning of the safety belt.

SUMMARY OF THE INVENTION

The purpose of the invention is to solve the above stated problem. Accordingly, it is an object of the present invention to provide a child safety belt device used in combination with a safety belt, for securing a smaller passenger, such as a child, with the safety belt by controlling the position of a shoulder band of the safety belt to accommodate the physical proportions of the child.

In order to achieve the above object, there is provided a child safety belt device used in combination with a safety belt, the device having: a fixing portion for fixing the device to the safety belt, the fixing portion being detachably fixed to a waist band of the safety belt; a link portion attached to a shoulder band of the safety belt; a band for connecting the fixing portion with the link portion, the band being adjustable in length; and a stopper mounted to the band, for preventing the band for keeping the length of the band in place.

In addition, the fixing portion further includes: a body; a hole forming in an upper portion of the body whereby the band is attached to the fixing portion; side supporting members formed at the sides of the body; a groove formed at one of the side supporting members; a hinge hole formed in the center portion of the other side supporting member; and a bottom plate having hinge parts that are formed at opposite sides of the bottom plate, the bottom plate being detachably installed between the hinge hole and groove by inserting the hinge parts in the hinge hole and groove, forming a hinge, wherein the waist band is sandwiched between the body and the bottom plate when the fixing portion is attached to the safety belt.

Furthermore, the link portion further includes: a hole formed at a lower portion of said link portion whereby the other end of the band is attached; a link formed at one side of the link portion for attaching the link portion to the shoulder band; and a cover mounted at one side of the link portion opposite to the link.

As described above, in the child safety belt device, a parent or adult mounts the fixing portion of the safety device to the waist band of the safety belt and hangs the link portion onto the shoulder band. The shoulder band is then pulled toward the waist band by the device to place the shoulder band over the shoulder of the child. Accordingly, when the child is secured by the safety belt, the shoulder band is properly positioned over the child's shoulder, adjusting to the physical proportions of the child. Therefore, the child is adequately and comfortably secured by the safety belt when riding in the vehicle.

BRIEF DESCRIPTION OF THE DRAWINGS

The above object, characteristics and advantages of the present invention will better understood with reference to the following detailed description of the invention, appended claims, and attached drawings wherein:

DETAILED DESCRIPTION OF THE INVENTION

Hereinbelow, the preferred embodiment of the present invention will be explained in detail with reference to the accompanying drawings.

Figure 5:
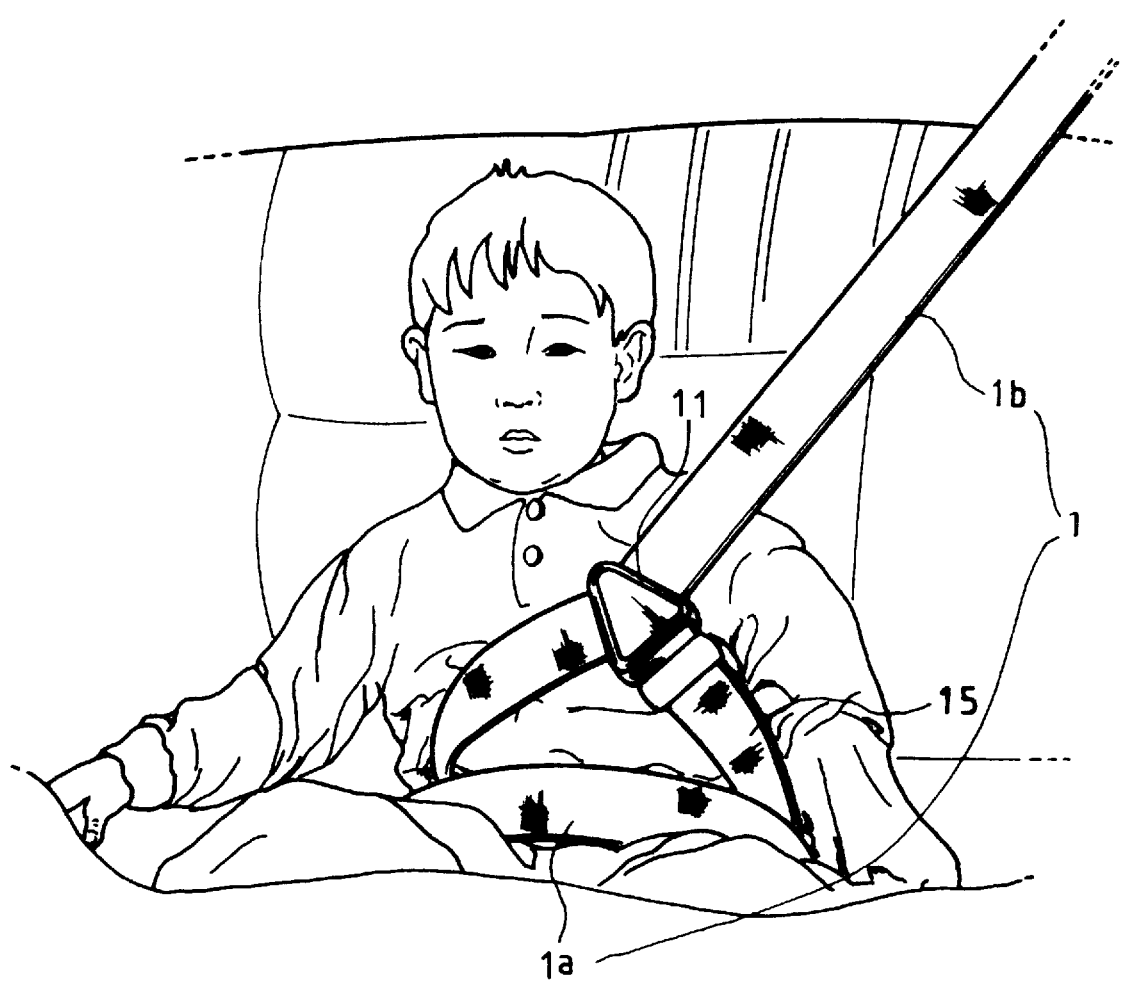
FIG. 5 is a view of the child safety belt device in use, according to the preferred embodiment of the present invention.

As shown in FIG. 5, a typical safety belt 1 includes a waist band 1a and a shoulder band 1b. A child safety belt device that is attached to the safety belt 1 includes a fixing portion 2 for attaching to the waist band 1a (not shown in this figure), a link portion 11 for attaching to the shoulder band 1b, and a band 15 that connects the fixing portion 2 and the link portion 11.

Figure 1:
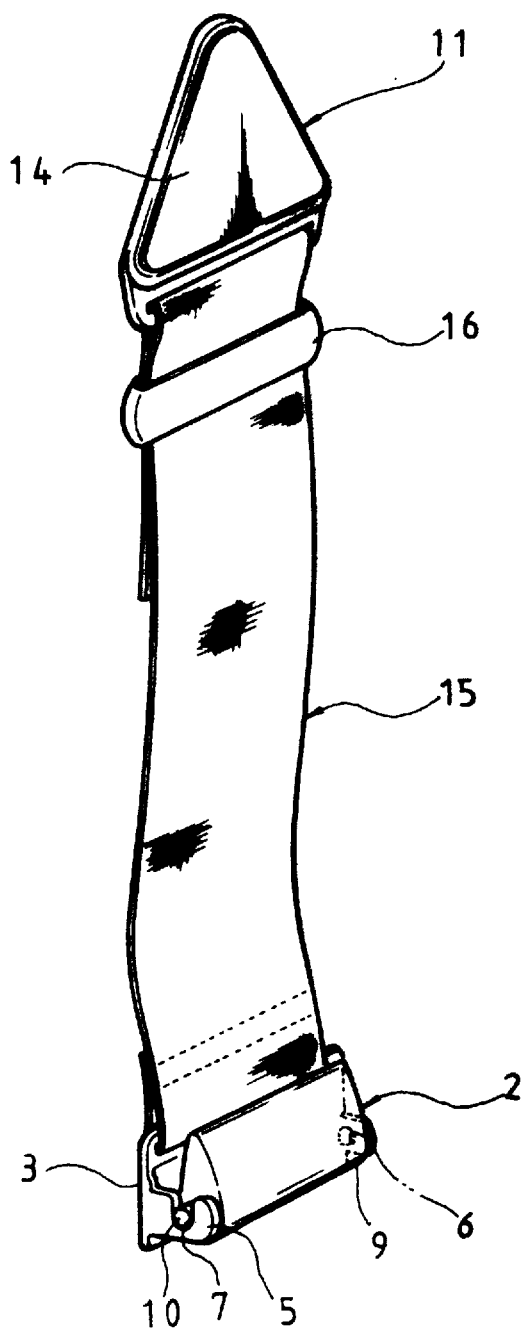
FIG. 1 is a perspective view of a child safety belt device according to a preferred embodiment of the present invention.
Figure 3:
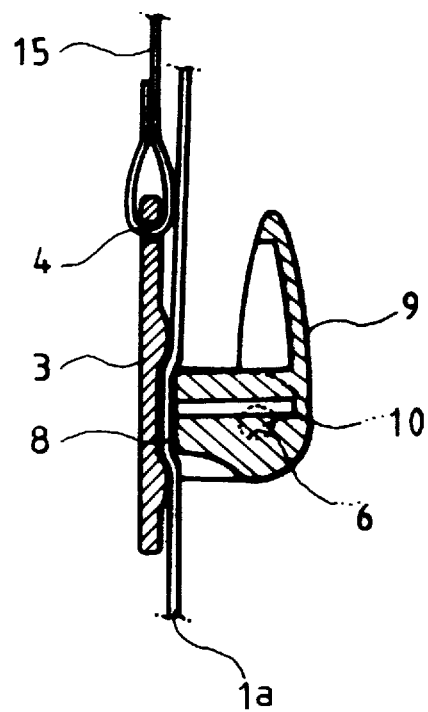
FIG. 3 is a detailed sectional view of a fixing portion of the device shown in FIG. 1.

Referring now to FIGS. 1 and 3, the fixing portion 2 will be described hereinbelow. A hole 4 is formed at an upper portion of a body 3 of the fixing portion 2 whereby one end of the band 15 is attached. Side supporting members 5 are formed at the sides of the body 3 of the fixing portion 2. A hinge hole 6 is formed at a center portion at one of the side supporting members 5, and a groove 7 is formed at a center portion at the other side supporting member 5. A bottom plate 9 having a protrusion 8 is installed between the hinge hole 6 and groove 7. The bottom plate 9 has hinge parts 10 which are formed at opposite sides of the bottom plate 9. The bottom plate 9 is detachably installed between the hinge hole 6 and the groove 7 by inserting the hinges parts 10 into the hinge hole 6 and the groove 7, forming a hinge.

When the fixing portion 2 of child safety belt is installed to the waist band 1a of the safety belt 1, the bottom plate 9 is first detached from the body 3 of the fixing portion 2. The body 3 of the fixing portion 2 is then arranged on the underside of the waist band 1a, and the bottom plate 9 is reattached to the body 3. Thereafter, as shown in FIG. 3, the waist band 1a is sandwiched between the body 3 and the bottom plate 9, the protrusion 8 being pressed against the waist band 1a and the body 3. The child safety device is thus securely fixed to the safety belt 1.

Figure 2:
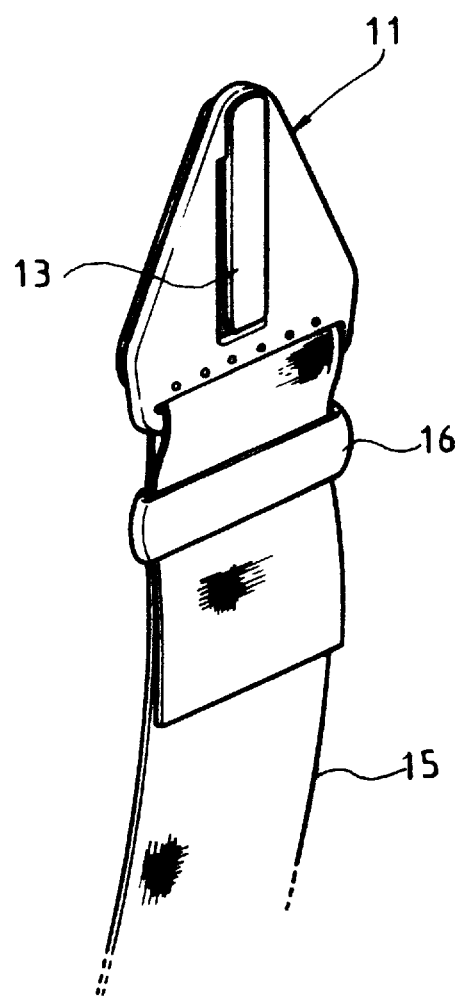
FIG. 2 is a partial perspective view of a link portion of the device shown in FIG. 1.
Figure 4:
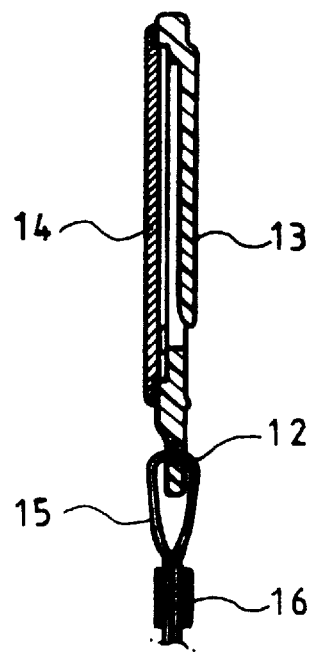
FIG. 4 is a detailed section view of the link.

Meanwhile, referring to FIGS. 1, 2, and 4, the link portion 11 includes a hole 12, a link 13 and a cover 14. The hole 12 is formed at a lower portion of the link portion 11 whereby the other end of the band 15 is attached, and the link 13 is formed at an upper portion of the link portion 11. A cover 14 is mounted onto one side, opposite to the link 13, of the link portion 11. The link portion 11 is attached to the safety belt 1 by hanging the link 13 onto the shoulder band 1b, wherein the shoulder band is secured by the link 13.

Referring to FIGS. 1, 2, 3, and 4, as stated earlier, the band 15 is attached to the fixing portion 2 and the link portion 11 through the respective holes 4 and 12. The length of the band 15 can be adjusted by controlling the length of the band 15 that passes though the hole 12 of the link portion 11. A stopper 16 is provided at the upper portion of the band 15 to keep the length of the band 15 in place.

The operation of the child safety belt device according to the present invention is described hereinbelow with reference to FIG. 5.

First, after the child has been seated, the safety belt 1 is pulled over the child. The fixing portion 2 (not shown in this figure) is then fixed to the waist band 1a in the manner as described above. The link portion 11 is then attached to the shoulder band 1b and the length of the band 15 is adjusted in the manner as described above wherein the position of the link portion 11 and the length of the band 15 is adjusted to fit the physical proportions of the child. As can be seen in FIG. 5, the shoulder band 1b is thus pulled towards the waist band 1a in order to achieve the correct positioning over the child's shoulder, and does not overlap the child's head or neck. In addition, because the length of the band 15 and position of the link portion 11 are adjustable, the child safety belt device can accommodate the varying physical proportions of any particular child.

While the present invention has been particularly shown and described with reference to a particular embodiment thereof, it will be understood by those skilled in the art various changes in form and detail may be effected therein without departing from the spirit and scope of the present invention as defined by the appended claims.

What is claimed is:

1. A child safety belt device used in combination with a safety belt, said device comprising:

a fixing portion for fixing said device to the safety belt, said fixing portion being detachably fixed to a waist band of the safety belt, wherein said fixing portion includes a body, a hole formed in an upper portion of said body, whereby the band is attached to the fixing portion, side supporting members formed at the sides of said body, a groove formed at one of the side supporting members, a hinge hole formed in the center portion of the other side supporting member, and a bottom plate having hinge parts that are formed at opposite sides of said bottom plate, the bottom plate being detachably installed between the hinge hole and groove by inserting the hinge parts in the hinge hole and groove, forming a hinge, wherein the waist band is sandwiched between the body and the bottom plate when the fixing portion is attached to the safety belt;

a link portion being attached to a shoulder band of the safety belt;

a band for connecting said fixing portion with said link portion, said band being adjustable in length; and a stopper mounted on said band for keeping the length of said band in place.

2. The child safety belt device, as claimed in claim 1, wherein said link portion further comprises:

a hole formed at a lower portion of said link portion whereby an end of the band is attached;

a link formed at one side of the link portion for attaching the link portion to the shoulder band; and a cover mounted at one side of the link portion opposite to said link.

* * * * *